(No Model.) 2 Sheets—Sheet 1.
E. B. ALLEN.
SEWING MACHINE TRIMMER.
No. 579,632. Patented Mar. 30, 1897.
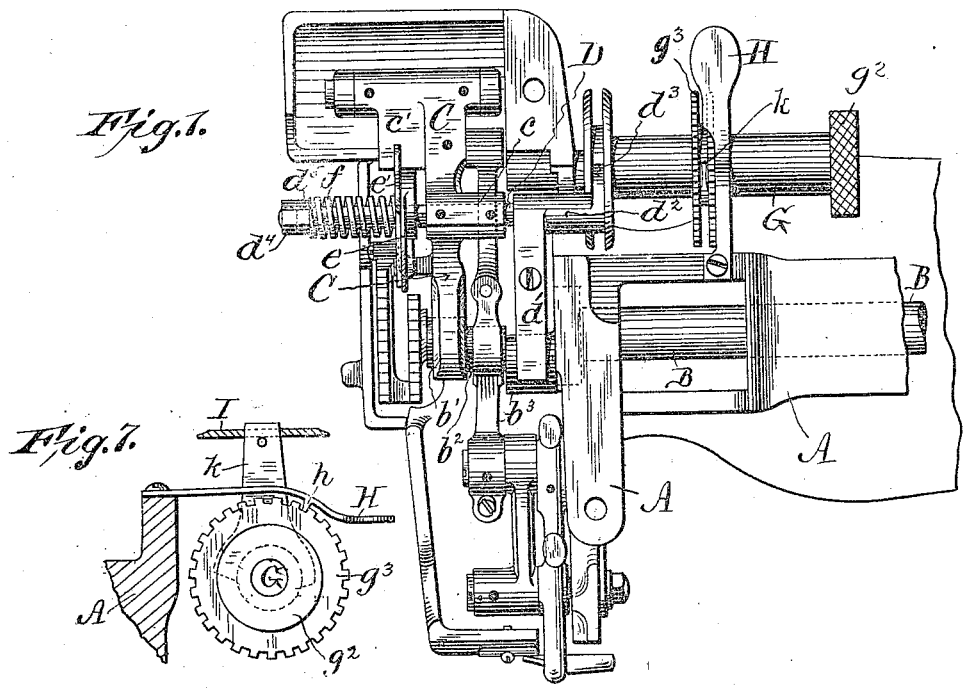
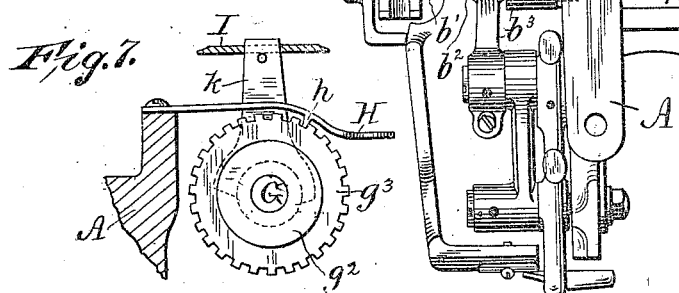
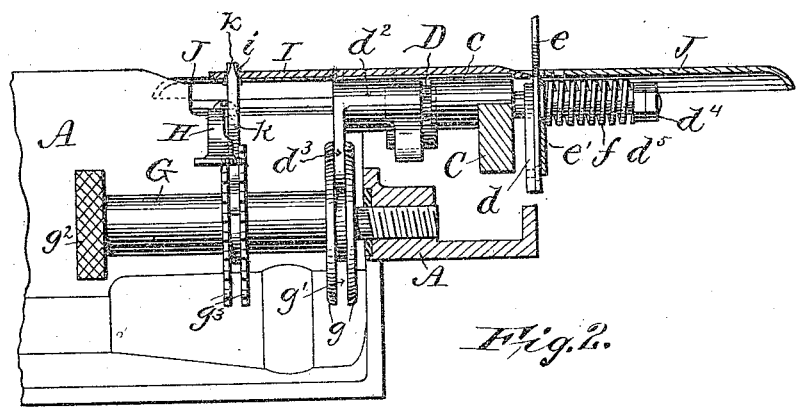
Attest:
C. W. Benjamin.
C. M. Sweeney.
Inventor:
Edward B. Allen,
by Henry Calver, Atty.

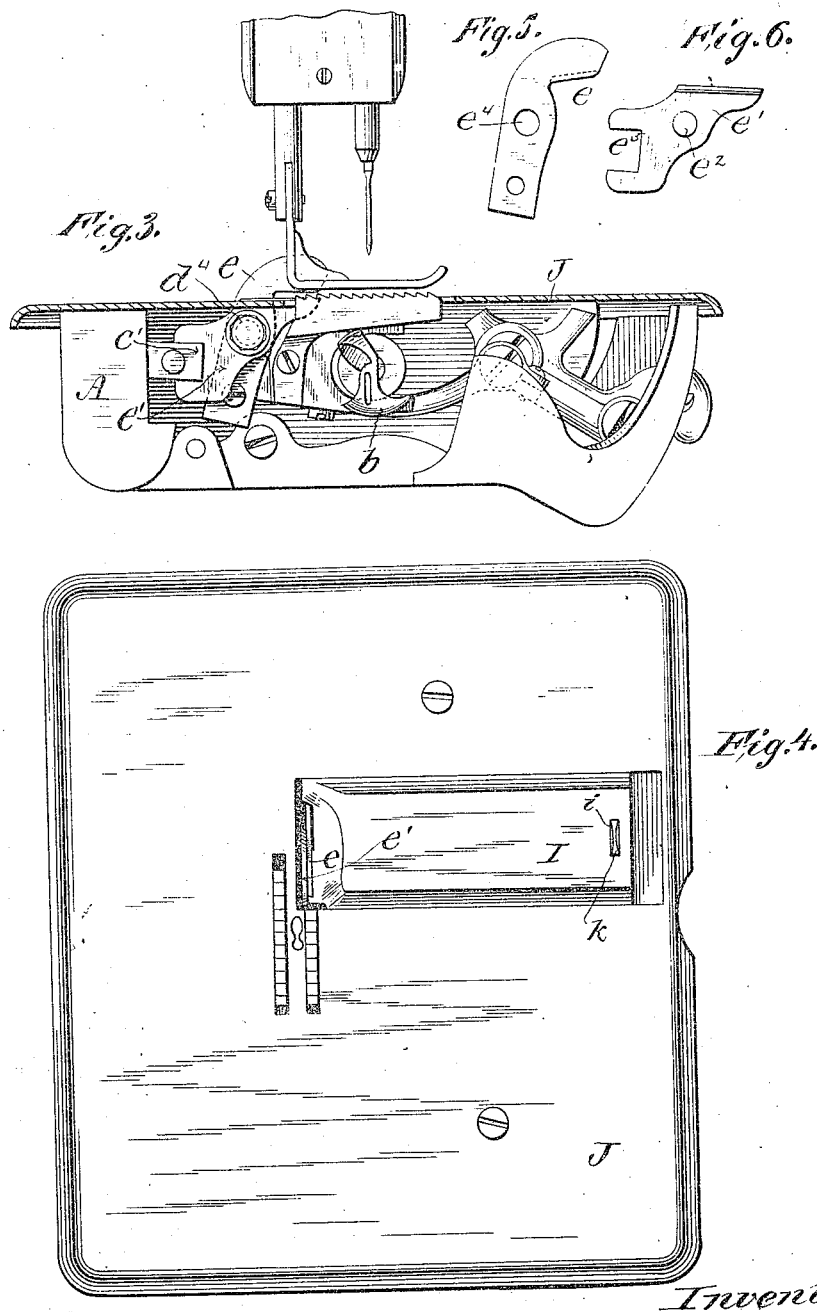

UNITED STATES PATENT OFFICE.

EDWARD B. ALLEN, OF ELIZABETH, NEW JERSEY, ASSIGNOR TO THE SINGER MANUFACTURING COMPANY, OF NEW JERSEY.

SEWING-MACHINE TRIMMER.

SPECIFICATION forming part of Letters Patent No. 579,632, dated March 30, 1897.

Application filed December 16, 1896. Serial No. 615,838. (No model.)

*To all whom it may concern:*

Be it known that I, EDWARD B. ALLEN, a citizen of the United States, residing at Elizabeth, in the county of Union and State of New Jersey, have invented certain new and useful Improvements in Sewing-Machine Trimmers, of which the following is a specification, reference being had therein to the accompanying drawings.

My invention relates to that class of sewing-machine trimmers by means of which the surplus material extending beyond the seam is removed simultaneously with the sewing operation, my present invention being an improvement on the trimming device embraced by my United States Patent No. 561,078, granted June 2, 1896.

In this my present invention the upper and lower blades or knives constituting the shear trimming device are loosely mounted, so that they may be simultaneously adjusted laterally to vary the distance between the line of trimming and the line of stitching, and I provide an adjusting device (preferably a screw) which is connected with the adjustable shear-trimmer in such a manner that by moving said adjusting device the attendant may vary the lateral position of the trimming-blades as may be desired, and this may be effected whether the machine be in operation or at rest. To prevent accidental displacement of the trimmer from the jarring of the machine when in operation, I provide means for retaining the adjusting device (and consequently the shear-trimmer with which said adjusting device is connected) in any position to which it may be moved by the attendant.

In the use of shear trimming devices considerable annoyance is occasioned by lint and dust, resulting from the cutting, which work down into and clog the mechanism below the cloth-plate. This difficulty is of course greater where the trimmer is laterally adjustable and where a slot of considerable width has to be made in the cloth-plate to permit of the lateral adjustment of the trimmer. To obviate this difficulty, I provide, in connection with my laterally-adjustable trimmer, an adjustable lint or dust guard consisting, preferably, of a sliding plate one end of which extends closely adjacent to the blades of the trimmer, and which lint-guard is connected with said adjusting device so as to move laterally therewith, and consequently with the trimmer when the latter is adjusted to vary the line of trimming. The lint or dust guard thus always preserves its close relation to the trimmer without any special care on the part of the attendant, and thus the slot in the cloth-plate required for the action of the trimmer will always be kept as nearly closed as possible, so that in my improved machine very little lint or dust works down beneath the cloth-plate.

In the accompanying drawings, Figure 1 is a partial plan view of the lower part of a "Singer" single-thread chain-stitch machine embodying my invention, the cloth-plate being removed. Fig. 2 is a partial rear side sectional view of the same. Fig. 3 is a partial front end view of the machine with the lower end cover-plate removed. Fig. 4 is a plan view of the cloth-plate, showing the adjustable lint-guard and other parts. Figs. 5 and 6 are detail views of the trimming knives or blades, and Fig. 7 is a detail view of the device for preventing rotation of the trimmer-adjusting screw.

A denotes a part of the frame of the machine, and B the lower rotating driving-shaft, carrying the single-thread chain-stitch looper $b$, the feed-eccentrics $b'$ and $b^2$, and a third or trimmer-operating eccentric $b^3$. Mounted in a bearing portion $c$ of the horizontally-reciprocating and vertically-vibrating feed-bar C is a small rock-shaft D, having a depending arm $d$, to which is attached the shank of the upper shear-blade $e$, said rock-shaft passing through a hole $e^4$ in said blade, and said shaft having a horizontal arm $d'$, forked to embrace the eccentric $b^3$. The arm $d'$ has a sleeve $d^2$ rigidly attached to said shaft, and said sleeve is provided with a depending lug $d^3$.

The lower shear-blade $e'$ is placed loosely on the rock-shaft D, said blade having a hole $e^2$, through which said shaft passes. Said blade is also provided with a notch $e^5$ to embrace a lug $c'$ on the feed-bar C, so that while said blade is thus held rigid with said feed-bar it is free to be adjusted laterally relative thereto. A coil-spring $f$, interposed between the blade $e'$ and an adjusting-nut $d^5$ on the shaft D, holds the said blade closely against the blade $e$, a lock-nut $d^4$ securing said adjusting-nut in place.

G is an adjusting-screw tapped in a portion of the frame A and provided with flanges $g$, between which is an annular groove $g'$, into which extends the lug $d^3$ of the sleeve $d^2$, so that by turning said screw by its milled head $g^2$ the rock-shaft D and the shear-blades $e$ and $e'$, mounted thereon, may be moved laterally toward or from the needle or the line of stitching, according to the direction in which said screw may be turned. To prevent accidental displacement of the adjusting-screw, the latter is provided with a toothed wheel or flanges $g^3$ to be engaged by a lug or tooth $h$ of a holding-spring H.

I is a lint or dust guard made in the form of a sliding plate adjustably mounted on the cloth-plate J, the outer end of said plate or lint-guard I fitting closely adjacent to the shear-blades $e$ and $e'$, but not being in actual contact therewith, so as to interfere with the free action thereof. The plate or lint-guard I is provided with a slot at $i$, up through which extends the upper end of a plate or shoe $k$, placed loosely in an annular groove between the flanges of the toothed wheel $g^3$, where it is retained by an overhanging part of the spring H. As the said plate or lint-guard I, mounted in said groove, will be moved laterally by the screw G when the latter is turned to adjust the shear-blades of the trimmer it will be apparent that the said plate or guard will always preserve its close relation to the shear-blades, so that there will be no opening formed on the cutting sides of said blades when the trimmer is adjusted laterally, and thus lint or dust will largely be prevented from working downward through the cloth-plate. In this connection it may be observed that the trimmer and the lint-guard have a common adjusting device, to wit, the screw G, so that they will have coincident lateral movements during adjustment.

The operation of my improved trimmer is essentially the same as that of my Patent No. 561,078, hereinbefore referred to, in that the lower blade $e'$ rises and falls with the feed-bar, while the upper blade $e$ is vibrated, so that it descends to close the shears when the blade $e'$ rises, the shears opening when the feed-bar is performing its idle or return movement and closing when the feed is moving forward to advance the work. When it is desired to adjust the trimmer laterally, the attendant simply lifts the holding-spring H from its engagement with the toothed wheel $g^3$ and then turns the adjusting-screw G by its milled head $g^2$ to effect the desired adjustment of the trimmer toward or from the needle of the machine, and this adjustment may be effected whether the machine be running or not.

Having thus described my invention, I claim and desire to secure by Letters Patent—

1. The combination with the stitch-forming mechanism of a sewing-machine, of a shear trimming device, comprising upper and lower knives or blades, loosely mounted for lateral adjustment, an adjusting device connected with said blades and by means of which adjusting device the lateral position of the said blades may be varied either when the machine is in operation or at rest, and means for holding the said adjusting device stationary in any position to which it may have been moved.

2. The combination with the stitch-forming mechanism of a sewing-machine, of a shear trimming device, comprising upper and lower knives or blades, loosely mounted for lateral adjustment, an adjusting device connected with said blades and by means of which adjusting device the lateral position of the said blades may be varied either when the machine is in operation or at rest, means for holding the said adjusting device stationary in any position to which it may have been moved, a laterally-movable lint-guard extending closely adjacent to said shear-blades, and means whereby said lint-guard may be moved laterally with said blades when the lateral positions of the latter are changed by said adjusting device.

3. The combination with the stitch-forming mechanism of a sewing-machine, of a feed-bar, a laterally-adjustable shear-trimmer mounted on said feed-bar and an adjusting device whereby the said trimmer may be moved laterally relative to said stitch-forming mechanism.

4. The combination with the stitch-forming mechanism of a sewing-machine, of a feed-bar, a laterally-adjustable shear-trimmer mounted on said feed-bar and a laterally-adjustable lint-guard coincidently movable with said shear-trimmer.

5. The combination with the stitch-forming mechanism of a sewing-machine, of a feed-bar, a rock-shaft mounted in said feed-bar and laterally adjustable relative thereto, an upper shear-blade vibrated by said rock-shaft, a lower shear-blade movable with but stationary relative to said feed-bar, and a spring for holding said blades in cutting contact with each other.

6. The combination with the stitch-forming mechanism of a sewing-machine, of a feed-bar, a rock-shaft mounted in said feed-bar and laterally adjustable relative thereto, an upper shear-blade vibrated by said rock-shaft, a lower shear-blade movable with but stationary relative to said feed-bar, a spring for holding said blades in cutting contact with each other, and a laterally-adjustable lint-guard.

7. The combination with the stitch-forming mechanism of a sewing-machine, of a shear-trimmer comprising upper and lower blades both of which are laterally adjustable relative to the needle of the machine, and an adjusting-screw connected with said blades and by turning which their lateral adjustment may be effected.

8. The combination with the stitch-forming mechanism of a sewing-machine, of a shear-trimmer comprising upper and lower blades both of which are laterally adjustable relative to the needle of the machine, an adjusting-screw connected with said blades and by turning which their lateral adjustment may be effected, and means for retaining said screw in any desired position of adjustment.

9. The combination with the stitch-forming mechanism of a sewing-machine, of a shear-trimmer comprising upper and lower blades both of which are laterally adjustable relative to the needle of the machine, an adjusting-screw connected with said blades and by turning which their lateral adjustment may be effected, means for retaining said screw in any desired position of adjustment, and a laterally-adjustable lint-guard connected with said screw to be adjusted by the latter coincidently with said shear-blades.

In testimony whereof I affix my signature in presence of two witnesses.

EDWARD B. ALLEN.

Witnesses:
J. G. GREENE,
JOSEPH F. JAQUITH.